US012285376B1

(12) United States Patent
Spencer

(10) Patent No.: US 12,285,376 B1
(45) Date of Patent: Apr. 29, 2025

(54) STRETCH APPARATUS AND METHOD OF MULTIDIRECTIONAL STRETCHING USING SAME

(71) Applicant: Spence Spencer, Phoenix, AZ (US)

(72) Inventor: Spence Spencer, Phoenix, AZ (US)

( * ) Notice: Subject to any disclaimer, the term of this patent is extended or adjusted under 35 U.S.C. 154(b) by 313 days.

(21) Appl. No.: 17/890,667

(22) Filed: Aug. 18, 2022

Related U.S. Application Data

(60) Provisional application No. 63/234,540, filed on Aug. 18, 2021.

(51) Int. Cl.
*A61H 1/02* (2006.01)

(52) U.S. Cl.
CPC ... *A61H 1/0266* (2013.01); *A61H 2201/0192* (2013.01); *A61H 2201/1253* (2013.01); *A61H 2201/1642* (2013.01)

(58) Field of Classification Search
CPC ...... A61H 1/00; A61H 1/0266; A61H 1/0218; A61H 1/0229; A61H 1/02; A61H 1/005; A61H 2201/1642; A61H 2201/1645; A61H 2201/0192; A61H 2201/1253; A61B 6/04; A61F 5/00
USPC ....... 128/845; 601/23, 27, 28, 32, 33, 34, 49
See application file for complete search history.

(56) References Cited

U.S. PATENT DOCUMENTS

| | | | | |
|---|---|---|---|---|
| 7,934,687 | B2 * | 5/2011 | Crook | A61F 5/3761 5/624 |
| 8,801,640 | B2 * | 8/2014 | Sevy | A63B 23/03508 601/24 |
| 2002/0193710 | A1 * | 12/2002 | Main | A61H 1/0266 601/5 |
| 2004/0070254 | A1 * | 4/2004 | Conlon | A47C 16/02 297/423.41 |

* cited by examiner

*Primary Examiner* — Caitlin A Carreiro
(74) *Attorney, Agent, or Firm* — Invention To Patent Services; Alex Hobson

(57) ABSTRACT

A stretch apparatus incorporates an ankle beam to secure a person's ankle up with their leg secured on a leg beam to stretch the hip, including rotating the torso while the leg is retained in the stretch apparatus. An exemplary ankle beam has an ankle beam cup, or a depression to retain the ankle on the ankle beam and prevent the ankle from sliding, which might cause injury during a stretch. The leg beam has a leg beam cup to retain a portion of the leg. The leg beam and ankle beam may have a plurality of cups or depression, including a left, right and center cup. A brace beam is configured to extend along the length axis of the stretch apparatus and vertically between the leg beam and ankle beam. A foot brace may be detachably attachable to one of the leg or ankle risers.

15 Claims, 8 Drawing Sheets

STRETCH APPARATUS AND METHOD OF MULTIDIRECTIONAL STRETCHING USING SAME

CROSS REFERENCE TO RELATED APPLICATIONS

This application claims the benefit of priority to U.S. provisional patent application No. 63/234,540, filed on Aug. 18, 2021; the entirety of which is hereby incorporated by reference herein.

BACKGROUND OF THE INVENTION

Field of the Invention

The invention relates to a stretch apparatus that incorporates an ankle beam to secure a person's ankle in an up position, with their leg bent, and with their leg secured in this bent configuration on a leg beam to stretch the hip, including rotating the torso while the leg is retained in the stretch apparatus to enable multidirectional stretching.

Background

Many people suffer from patellofemoral pain, Iliotibial band syndrome knee pain, lumbago (back pain), and hip pain, associated with tight hips and hamstrings. There are a number of stretching devices available however they are configured in most cases for stretching one muscle group or groups of muscles in one direction and typically along the length of the muscle.

SUMMARY OF THE INVENTION

The invention is directed to a stretch apparatus that incorporates an ankle beam to secure a person's ankle in an up position with their leg secured on a leg beam to stretch the hip, including rotating the torso while the leg is retained in the stretch apparatus. The stretch apparatus has an ankle beam and a leg beam wherein the ankle beam is configured above the leg beam to allow the person's leg to be held in a bent position with their leg and foot extending over and supported by the ankle beam while the leg, and particularly the thigh or knee is pressed and secured against the leg beam. These two points of restraint allows for stretching and compression of muscles and ligament in a new and effective way. A brace beam may be configured between the ankle beam and the leg beam to provide additional support and restraint as the leg is stretched. The brace beam may be configured to rotate for additional stretching positions.

Each of the ankle beam and the leg beam may be adjustable in position. The ankle beam and the leg beam may both be adjustable in height from a ground surface, or vertically as used herein, to accommodate people of different sizes. Also, the vertical offset distance, the distance between the ankle beam length axis and the leg beam length axis may be changes or adjusted for people of different sizes or for different stretches and points of contact on the leg. A vertical offset distance may be about 100 mm or more, about 150 mm or more, about 200 mm or more, about 250 mm or more, about 300 mm, about 400 mm or more and any range between and including the length offset distances provided. Also, the length offset distance, the horizontal distance between the ankle beam length axis and the leg beam length axis may be changed. A length offset distance may be about 100 mm or more, about 150 mm or more, about 200 mm or more, about 250 mm or more, about 300 mm or more and any range between and including the length offset distances provided.

An exemplary ankle beam has an ankle beam cup, or a depression to retain the ankle on the ankle beam and prevent the ankle from sliding, which might cause injury during a stretch. An ankle beam cup may be a curved depression that is concave in shape or may slope to an end of the ankle beam. The ankle beam may have a left ankle beam cup, a center ankle beam cup and a right ankle beam cup. The center ankle beam cup is centrally located along the length of the ankle beam, within about 20% of a center length position of the ankle beam and/or between the left and right ankle beam cups. The left and right ankle beam cups are configured proximal to the left and right ends of the ankle beam, respectively. The left and right ankle beam cups may extend to the end of the ankle beam and may be a sloped, curved or tapering surface to the end of the ankle beam.

Likewise, an exemplary leg beam has a leg beam cup, or a depression to retain an upper portion of the leg, such as the thigh in a secure position during the stretch. A leg beam cup may be a curved depression that is concave in shape or may slope to an end of the leg beam. The leg beam may have a left leg beam cup, a center leg beam cup and a right leg beam cup. The center leg beam cup is centrally located along the length of the leg beam, within about 20% of a center length position of the leg beam and/or between the left and right leg beam cups. The left and right leg beam cups are configured proximal to the left and right ends of the leg beam, respectively and may be a sloped, curved or tapering surface to the end of the leg beam.

An exemplary stretch enabled by the stretch apparatus includes a person positioning their ankle in one of the ankle beam cups and bending their leg at the knee to position the upper leg, or thigh, against the leg bean in one of the leg beam cups. The person may then twist at their hip by turning their torso to the left and/or right to further stretch the hip. This stretch may effectively stretch the hip flexor and other muscles along the leg, such as the thigh. An exemplary stretch apparatus may also include a brace beam that extends generally orthogonally, within about 30 degrees or orthogonal and preferably within about 20 degrees, to the leg and ankle beams and is configured to brace the leg for specific stretching. An exemplary brace beam may rotate to the left or right to provide some adjustment in the position of bracing the leg.

A cup, as used herein may be a curved depression that may be concave to receive and restrain the ankle or leg within the bottom of the concave depression, or may be sloped to the left or right end of the beam. The ankle beam and leg beam may be circular in cross-section and may be made of a resilient or elastic material, such as a foam or rubber, for example. A support shaft or rod may extend along the length axis of the ankle beam and/or leg beam and the resilient or elastic material. An elastic material is a material that can be deformed by a load and then regains the pre-deformed shape when the load is removed. The leg beam and/or ankle beam may be configured to rotate about their respective length axis, such as about a shaft that extends along the length axis. The resilient elastic material may be configured around the shaft and the shaft and/or the resilient elastic material may be configured to rotate.

The exemplary stretch apparatus is configured to enable stretching of various muscles, ligaments, and nerves include leg muscles, hip and pelvic muscles as well as gluteus muscles and back muscles. Muscles nerves and ligaments that may be stretched or otherwise treated with the exemplary stretch apparatus include, but are not limited to: satorius, vastus intermedius, vasus lateralis, vastus medialis, gastrocnemius, tibialis anterior, soleus, illopsoas (psoas major and iliacus), illiacus muscle, obturator intemus, piriformis, inguinal ligament, pectineus, obturator externus, adductor brevis, adductor longus, adductor magnus, gracillis gluteus maximus, gluteus medius, rectus femoris, piriformis, superior gemellus, quadratus femoris, sciatic nerve, rectus abdominis muscle, shin, tibialis anterior, extensor digitorum longus muscles, tensor fascia late muscle, iliotibial tract, and vastus lateralis.

The exemplary stretch apparatus enables support and counter pressure and restraint of the leg in various positions to enable a wide range of stretching positions. A downward force can be exerted on the ankle and/or leg along with counterforces from the ankle and leg beam. This counter force on the knee allows for a multidirectional force to be applied allowing for specific stretch activation of the smaller muscle in the front of the leg up to the core. The leg, such as the thigh of the leg, may be placed in the center leg beam cup with the foot or ankle in one of the ankle beam cups. With the knee bent the torso can be stretched or twisted laterally and/or forward or backward to stretch muscles, ligaments, and/or nerves. The leg or thigh may also be placed in one of the left or right leg beam cups thereby providing an offset position of the knee to the ankle beam cup for a different stretching position that may target different muscles, tendons or nerves or may stretch them in a different way. The thigh may be compressed, or pressed against the leg beam such that pressure and stretching of the thigh can be produced simultaneously. The exemplary stretch apparatus enables stretching of muscles from the origin to the insertion points of the muscle. The exemplary stretch apparatus enables push and pull stretching mechanisms to create multiple planes of stretching.

Many people suffer from back, hip and athletic performance issues related to tight hips. These muscles refer all the way up into the abdomen and may effect the psoas, psoas minor, Quadratus Lumborum, Iliacus muscles, etc. The multiple planes of the stretch enabled by the exemplary stretch apparatus enables the individual to access muscles in a method not traditionally experienced with other stretching devices. The angle at which the thigh can be braced with respect to the hip and torso, enables unique stretching orientations.

Gluteus medius and maximus can be stretched using the exemplary stretch apparatus enables with the upper leg braced in an offset angle to the toros and/or offset to the lower leg, thereby enabling unique stretching orientations for the Gluteus Medius and Maximus. The gastrocnemius and soleus can also be stretched by wedging the ankle in one of the ankle cups with the heel facing down into the cup or at an angle to enable various orientations for stretching. The exemplary stretch apparatus enables stretching of the tibialis anterior. These unique multi-directional stretches target the front of the leg and the core muscles such as the psoas that pulls on the spine and all the muscles that are coupled with the front of the leg muscles and front of the shin.

An exemplary stretch apparatus is adjustable to accommodate people of various sizes. The ankle beam and/or the leg beam may be adjusted in a vertical position, wherein the beam is moved up and down along a support, or riser as used herein, and locked into position by a lock. The risers may include apertures along the vertical extension of the riser and a pin may extend through a beam guide coupled to the beam and extending around the riser to engage with an aperture to lock the beam in a vertical position. Also, a length offset distance, a distance between the leg beam and ankle beam along a length axis of the stretch apparatus may be adjusted. In one embodiment, the ankle beam is rotatably engaged with the base and can rotate up about a pivot to change both the length offset distance and a vertical offset distance between the ankle beam and leg beam.

In another embodiment, the base of the stretch apparatus comprises an ankle base portion and a leg base portion, wherein the ankle beam is attached to the ankle base portion and the leg beam is attached to the leg base portion. These two portions may be slidably engaged with each other and may utilize a pin-aperture arrangement to change the length offset distance between the ankle beam and leg beam.

An exemplary brace beam may be detachably attachable to the stretch apparatus, such as being detachable to the base by a brace riser. The brace beam may also be adjustable in a vertical position along a brace riser and may utilize a pin-aperture arrangement. In addition, a brace beam may be slidably engaged along the width of the stretch apparatus and again may utilize a pin-aperture arrangement between a brace base coupler and cross base extension that extends across at least a portion of the width of the base of the stretch apparatus or preferably completely across the width from a left extension to a right extension of the base; for support reasons. Furthermore, a brace beam may be configured to rotate about a pivot on a brace riser, wherein an extended end of a brace beam can swing from one side of the stretch apparatus to the other, or from a right extension of the base to a left extension of the base, for example.

The leg beam and/or ankle beam may be configured with a cushion to provide comfort during the stretching. The cushion may include a resilient material, such as a foam. An exemplary foam may be a polyurethane foam. Likewise, a brace beam may include a cushion comprised of a foam material. The foam may extend around the perimeter of the leg and/or ankle beam and may be cylindrical. The cross sectional shape of the leg, ankle and/or brace beam may be circular. The leg, ankle and/or brace beam may be an effective diameter to provide support without applying too much pressure to the leg or body, such as about 75 mm or more, about 100 mm or more, about 125 mm or more, about 150 mm or more, about 200 mm or less and nay range between and including the diameter values provided. The cylindrical shape may vary in diameter to create recesses in the outer perimeter, or cups for receiving the ankle, such as in the ankle beam cup, or thigh, such as in a leg beam cup. The leg beam may have a center leg beam cup, a recess or depression that is centrally located along the length of the leg beam and/or a left leg beam cup and a right leg beam cup, configured proximal to the left and right ends of the leg beam, respectively. The ankle beam may have a center ankle beam cup, a recess or depression that is centrally located along the length of the leg beam and/or a left ankle beam cup and a right ankle beam cup, configured proximal to the left and right ends of the ankle beam, respectively. The cups may extend around the circumference of the leg and/or ankle beam. The cups may form hour-glass shapes along the beams. The left and right leg and ankle beam cups may be hour-glass depressions configured on the ends or may be tapered ends that taper toward the left and/or right ends of the beam.

The cups are depressions having a depression offset distance, or reduction in radius, that may be about 25 mm or more, about 50 mm or more, about 75 mm or more, about 100 mm or more. The depth of the depression or cup may need to be large enough to retrain the ankle or leg to prevent it from sliding during along the beam during stretching which could cause injury.

The ankle beam cups (left, center, right) may be a depression in the ankle beam cushion, such as a curved depression that may extend completely around the ankle beam. The radius of curvature of the ankle beam cup may be about 10 cm or more, about 15 cm or more, about 20 cm or more about 30 cm or less and any range between and including the radius of curvature values provided. If the radius of curvature is too large, the ankle may not be effectively retained in position. Likewise, the leg beam cups (left, center, right) may be a depression in the leg beam cushion, such as a curved depression that may extend completely around the leg beam. The radius of curvature of a leg beam cup may be about 15 cm or more, about 20 cm or more, about 30 cm or more about 40 cm or less and any range between and including the radius of curvature values provided. If the radius of curvature is too large, the leg may not be effectively retained in position and if too small may not accommodate the leg, or thigh therein. Note that the radius of curvature of the leg beam cup(s) may be greater than a radius of curvature of the ankle beam cup(s) as the leg, particularly the thigh is much larger than an ankle.

An exemplary stretch apparatus may also incorporate a foot brace that may be detachably attachable to either a leg or ankle tower or to the ankle beam, or leg beam. An exemplary foot brace has an aperture for extending down over one of the risers of either the ankle tower and/or leg tower. The foot brace may have an aperture for receiving a foot brace pin into an aperture in the ankle or leg tower. In this way, the foot brace can be positioned vertically along the riser in a desired position. An exemplary foot brace comprises a horizontal extension that can be configured to extend away or inward from the riser, or orthogonal to the length axis of the ankle or leg beg, or along a length axis of the stretch apparatus. An exemplary foot brace has a vertical extension that can be configured to extend up or down, such as from the extended end of the horizontal extension. An exemplary foot brace may also have a return extension that extends back from the vertical extension towards the foot brace lock, thereby forming a generally C-shaped foot brace. Note that the return extension may be horizontal or may be at an offset angle to more easily allow insertion of a foot around the vertical extension. Also note that the return extension of the foot brace may be shorter in length than the horizontal extension, such that the foot brace can be secured to a riser with the return extension below the top of the riser. The foot brace may be used to perform any number of stretches with a foot retained therein or thereon and may be used as a handle or lever to provide leverage and support to twist at the torso. The C-shaped foot brace can be faced any direction and is for placement of the foot to stretch the hamstrings and may be padded for comfort. The unique design of the C-shaped foot brace enables multi directional stretching, wherein the leg can be pulled in various directions, with the ankle and foot being held in place. The leg may be pulled downward at various angles from the foot brace, for example.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
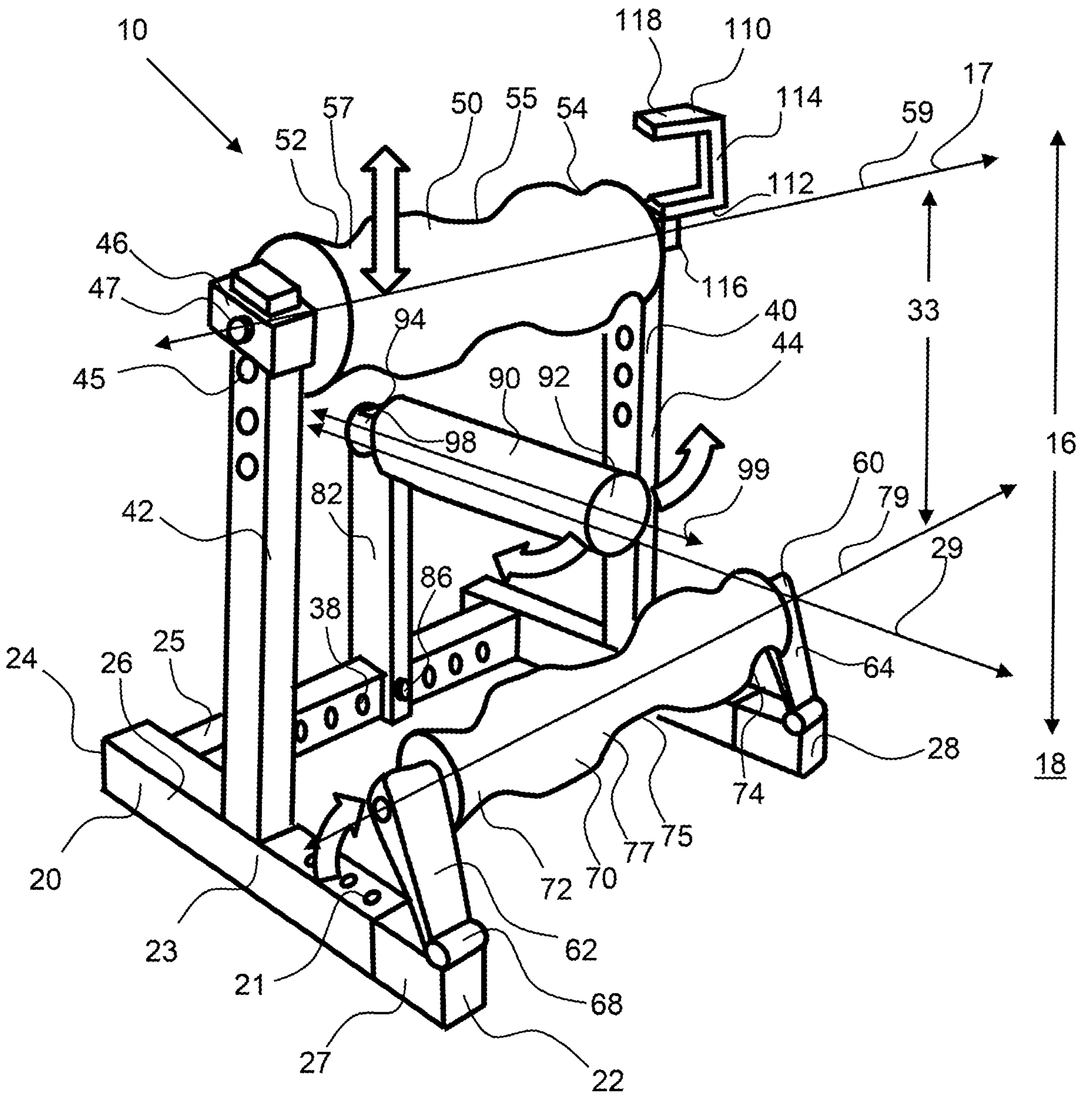
FIG. 1 shows a left front side perspective view of an exemplary stretch apparatus having an ankle beam, a leg beam and a brace beam all coupled to a base and configured for stretching with an ankle retained in one of the ankle beam cups of the ankle beam and the leg, such as the thigh portion of the leg, retained in one of the leg beam cups of the leg beam.
Figure 4:
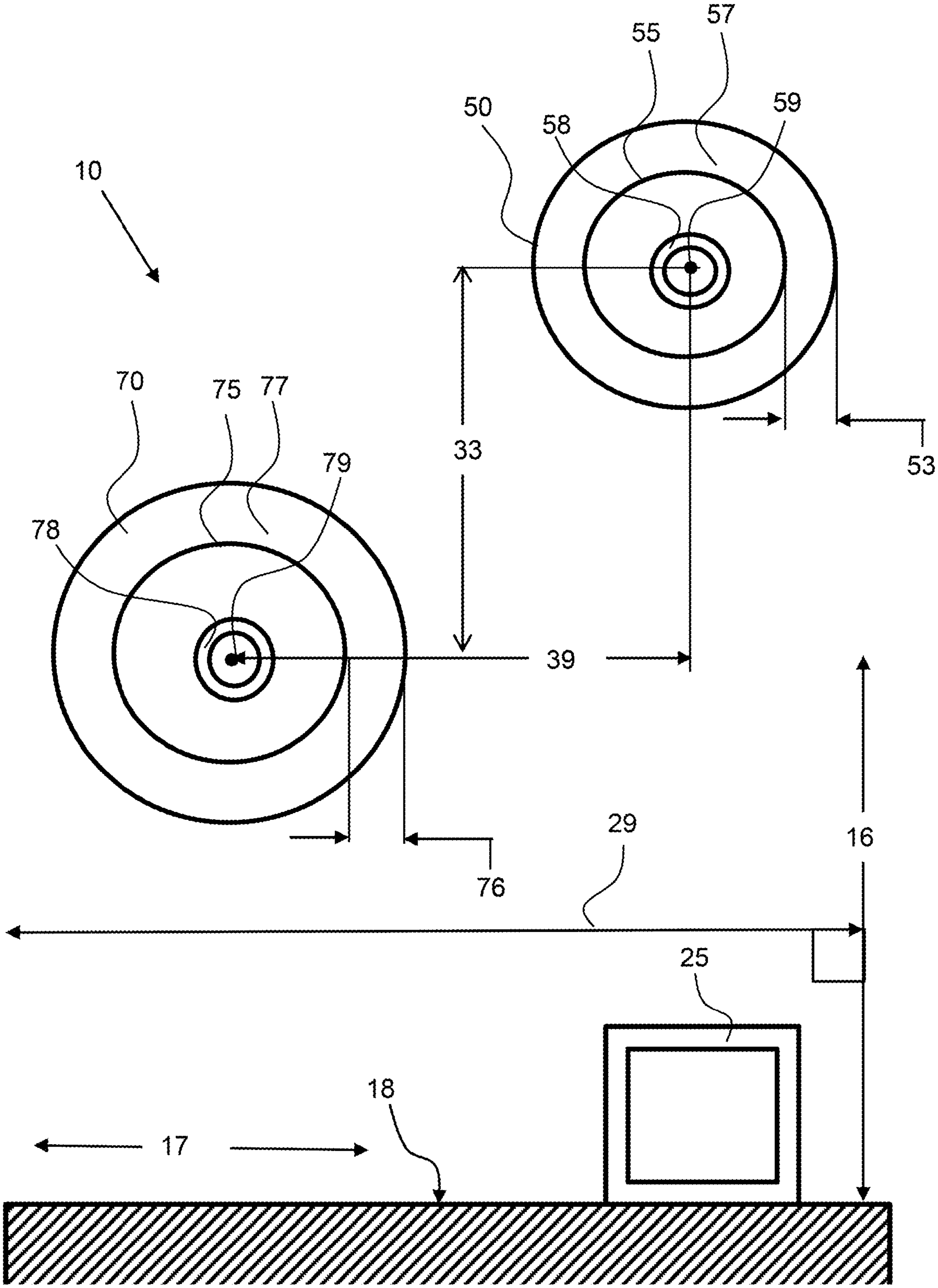
FIG. 4 shows a cross sectional view of the exemplary stretch apparatus along the length axis wherein the ankle beam is configured vertically above the leg beam and wherein the leg and ankle cups are shown.

Referring now to FIGS. 1 and 4, an exemplary stretch apparatus 10 has an ankle beam 50, a leg beam 70 and a brace beam 90 all coupled to a base 20 and configured for stretching muscles, connective tissue, tendons, ligaments, and the like, with an ankle retained in one of the ankle beam cups of the ankle beam and the leg, such as the thigh portion of the leg, or knee, retained in the one of the leg beam cups of the leg beam.

The ankle beam 50 has center ankle beam cup 55 configured between the left ankle beam cup 52 and right ankle beam cup 54. The leg beam has center leg beam cup 75 configured between the left leg beam cup 72 and the right leg beam cup 74. The left and right leg and ankle beam cups are configured proximal to the left and right ends of the respective beam, or sides of the stretch apparatus, respectively. The left and right leg beam or ankle beam cups may be configured within 25% of the length from the end of the respective beam.

The center leg beam cup 75 is centrally located between the left leg beam cup 72 and right leg beam cup 74 and is a concave curved surface. The left and right leg beam cups are an alternative location for bracing the leg, such as the thigh for additional stretching positions. The left and right leg beam cups may form a cup like depression in the outer surface of the leg beam, as shown, or may be a tapered portion or tapering of the leg beam, or elastic material 77 toward the left and right ends, respectively.

The ankle beam also has a center ankle beam cup 55, configured between the left ankle beam cup 52 and the right ankle beam cup 54 configured on the left and right ends of the ankle beam, respectively. The left and right ankle beam cups are an alternative location for bracing the foot or ankle for additional stretching positions. The left and right ankle beam cups may form a cup like depression in the outer surface of the ankle beam, as shown, or may be a tapered portion or tapering of the ankle beam, or elastic material 57 toward the left and right ends, respectively. The left and right ankle beam cups may be used to secure the foot or ankle in an offset orientation with respect to the position of the leg or thigh secured in one of the leg beam cups. The ankle may be placed in the left or right ankle beam cup and the leg may be placed in the center leg beam cup, for example. Alternatively, the leg or thigh may be place in the left or right leg beam cup and the ankle may be place in the center or the opposing ankle beam cup to the leg beam cup to provide an offset angle for stretching.

Figure 2:
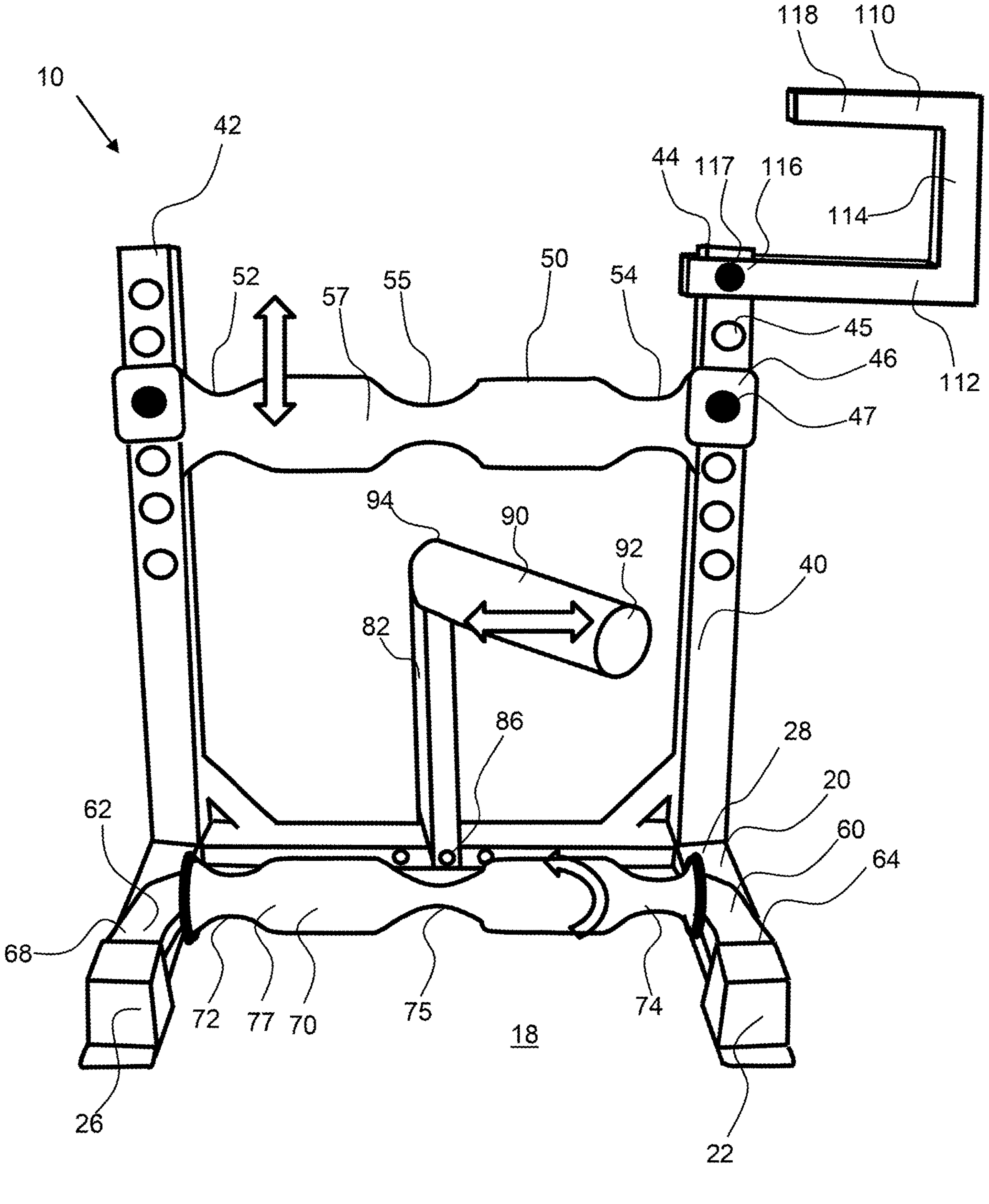
FIG. 2 shows a front perspective view of an exemplary stretch apparatus having an ankle beam, a leg beam and a brace beam all coupled to a base and configured for stretching with an ankle retained in one of the ankle beam cups of the ankle beam and the leg, such as the thigh portion of the leg, retained in one of the leg beam cups of the leg beam.

Also shown in FIGS. 1 and 2, a foot brace 110 having a C-shape may be detachably attachable to either the ankle tower 40, leg tower 60 or to the ankle beam, or leg beam. An exemplary stretch apparatus may include one or more, two or more, three or more, or even four or more foot braces. An exemplary foot brace has an aperture for extending down over one of the risers of either the ankle tower and/or leg tower. The foot brace may have an aperture for receiving a foot brace pin 117 into an aperture in the ankle or leg tower to form a foot brace lock 116, that locks the foot brace to the riser. In this way, the foot brace can be positioned vertically along the riser in a desired position. An exemplary foot brace comprises a horizontal extension 112 that can be configured to extend away or inward from the riser, or orthogonal to the ankle beam length axis 59 of the ankle beam or leg beam length axis 79 of the leg beam, or along a length axis 29 of the stretch apparatus. An exemplary foot brace has a vertical extension 114 that can be configured to extend up or down, such as from the extended end of the horizontal extension; wherein the foot brace can be coupled to the riser upside down from the orientation shown in FIGS. 1 and 2. An exemplary foot brace may also have a return extension 118 that extends back from the vertical extension towards the foot brace lock, thereby forming a generally C-shaped foot brace. The horizontal extension may be substantially horizontal or within about 40 degrees of horizontal and preferably within 30 degrees or even within 20 degrees of horizontal when the stretch apparatus is configured on a flat and horizontal surface. Note that the return extension may be horizontal or substantially horizontal, as defined herein, to provide an offset angle to more easily allow insertion of a foot around the vertical extension. Also note that the return extension of the foot brace may be shorter in length than the horizontal extension, such that the foot brace can be secured to a riser with the return extension below the top of the riser, or upside down, as described herein.

The foot brace has eight different configurations with respect to a riser, forward, outward, backward, inward and these again with the foot brace upside down. The foot brace may be used to perform any number of stretches with a foot retained therein or thereon and may be used as a handle or lever to provide leverage and support to twist at the torso. There are a number of clinical studies that support multidirectional stretching to achieve a better neurological response. The nerves release when different angles are applied simultaneously. It is a way to override the current tight muscle memory. In an exemplary embodiment, a pair of foot braces may be attached to the ankle risers and may be used for placing the hands within the C-shaped foot brace on the horizontal extension for stretching the arms, shoulders and chest.

The exemplary stretch apparatus 10 has brace beam 90 having a length axis 99 that extends along the length of the brace beam from the brace beam coupled end 94 to the brace beam extended end 92, which extends horizontally and between the ankle beam and the leg beam. The brace beam may extend substantially orthogonally to the length axis 59 of the ankle beam and the length axis 79 of the leg beam, or within about 30 degrees of orthogonal, or within about 20 degrees of orthogonal, as the brace beam is configured to pivot in the horizontal plane as indicated by the large curve arrows. The length axes of the ankle beam and the leg beam are substantially parallel to one another or within about 20 degrees of each other, and preferably within about 10 degrees of each other. The stretch apparatus 10 has a base 20 that is configured on a ground surface 18 and the vertical axis 16 is shown along with a horizontal axis 17, for reference. As shown the leg beam 70 and ankle beam 50 have a length axis that extends horizontally when the stretch apparatus 10 is placed on a flat horizontal ground surface 18.

The leg beam and ankle beam are adjustable in position with respect to each other to accommodate people of various sizes. The ankle beam 50 is coupled to the ankle tower 40 having a left ankle riser 42 and a right ankle riser 44, each extending vertically up from the base 20. The ankle beam is adjustable in height along the left and right ankle risers with the ankle beam lock 46 being configured to secure the ankle beam to the left and/or right ankle beam riser. An exemplary ankle beam lock is an ankle beam pin 47 that is configured to extend into one of a plurality of ankle riser apertures 45 configured in the left and/or right ankle beam riser. An ankle beam lock may be a ratchet type adjustment however. The ankle beam risers are taller, or extend vertically up to an ankle tower height that is greater than the leg beam riser height. As shown in FIG. 1, the ankle beam length axis 59 is a vertical offset distance 33 above the leg beam length axis 79.

The leg beam 70 is vertically adjustable and also adjustable in a length offset distance 39 with respect to the ankle beam. The length offset distance 39, as best shown in FIG. 4, is a distance measured along the length axis 29 of the frame that extends from the front 22 to the back 24 of the frame. The leg beam 70 may be adjustable in position via rotation about a leg tower pivot 68 that is configured between the left leg riser 62 and the left base extension 26, and also between the right leg riser 64 and the right base extension 28. The vertical position and length offset distance may be adjusted by this rotation. Also, the frame may be configured to expand in the length axis 29 wherein the leg base portion 27 is slidably engaged with the ankle base portion 23 and can be adjusted and then locked into position by inserting a retainer pin into a base length aperture 21. Again, a ratcheting engagement for changing the length may be employed. The leg beam may be vertically adjustable by sliding up and down along the left leg riser 62 and right leg riser 64, as shown in FIGS. 5 to 8. The leg risers shown in FIGS. 5 to 8 also have a leg tower pivot 68 comprising a plurality of apertures for receiving a retainer pin 69 to secure the leg beam in one of a plurality of locations.

The brace beam 90 is adjustable across the width of the frame wherein the brace beam riser 82 has a brace lock 86 that locks the brace riser to a cross-extension 25 of the base, such as into a base brace aperture 38. A plurality of base brace apertures are configured in the cross base extension 25. The brace lock may be a brace pin that is inserted into a base brace aperture 38. The brace beam is also rotationally adjustable about a brace beam pivot 98 configured between the brace beam and the brace beam riser 82. The extended end 92 of the brace beam can pivot to provide an effective location to brace the leg for stretching. The brace beam extends from a brace beam coupled end 94 to said brace beam extended end 92.

Figure 3:
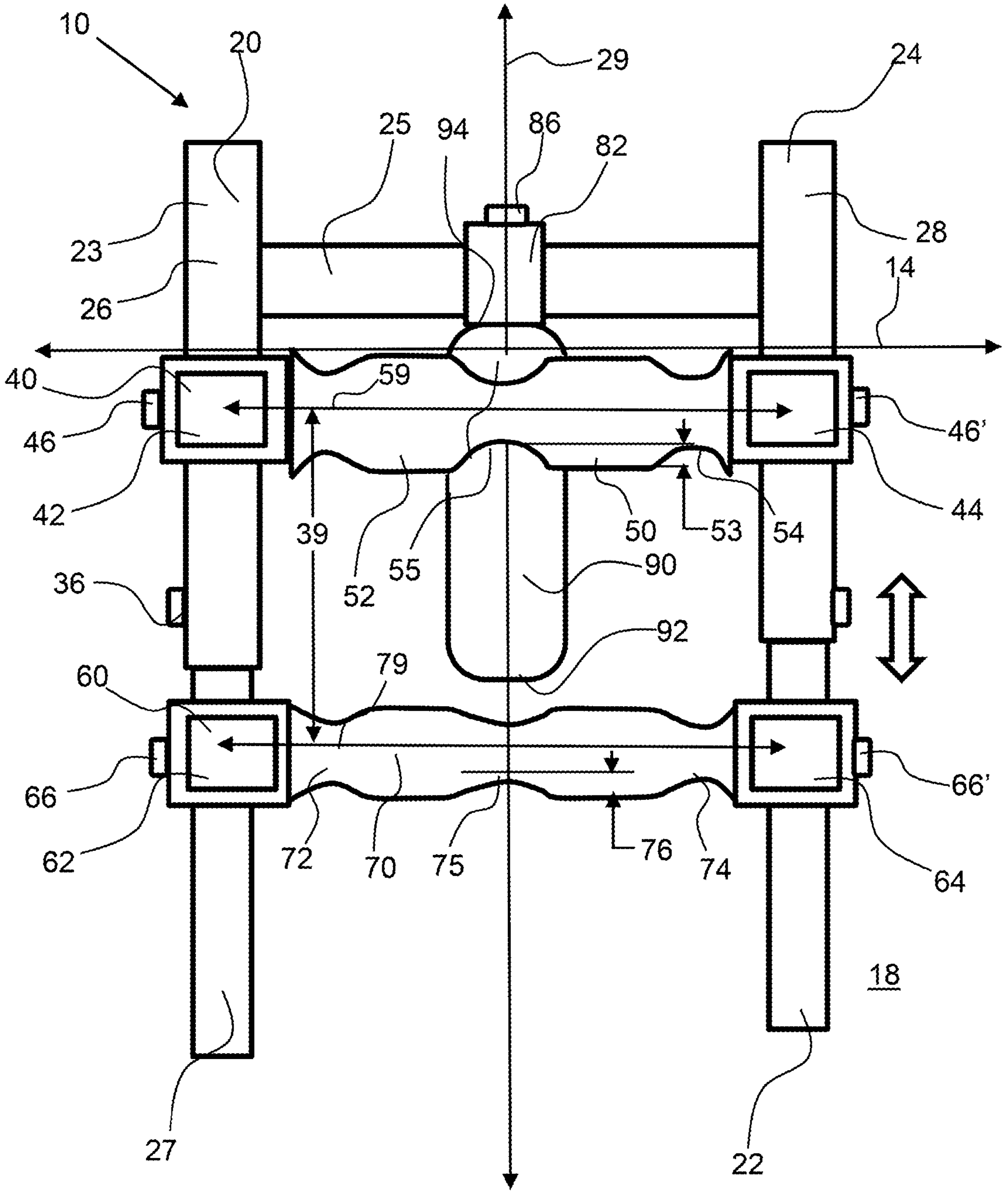
FIG. 3 shows a top view of an exemplary stretch apparatus having an ankle beam, a leg beam and a brace beam all coupled to a base.
Figure 5:
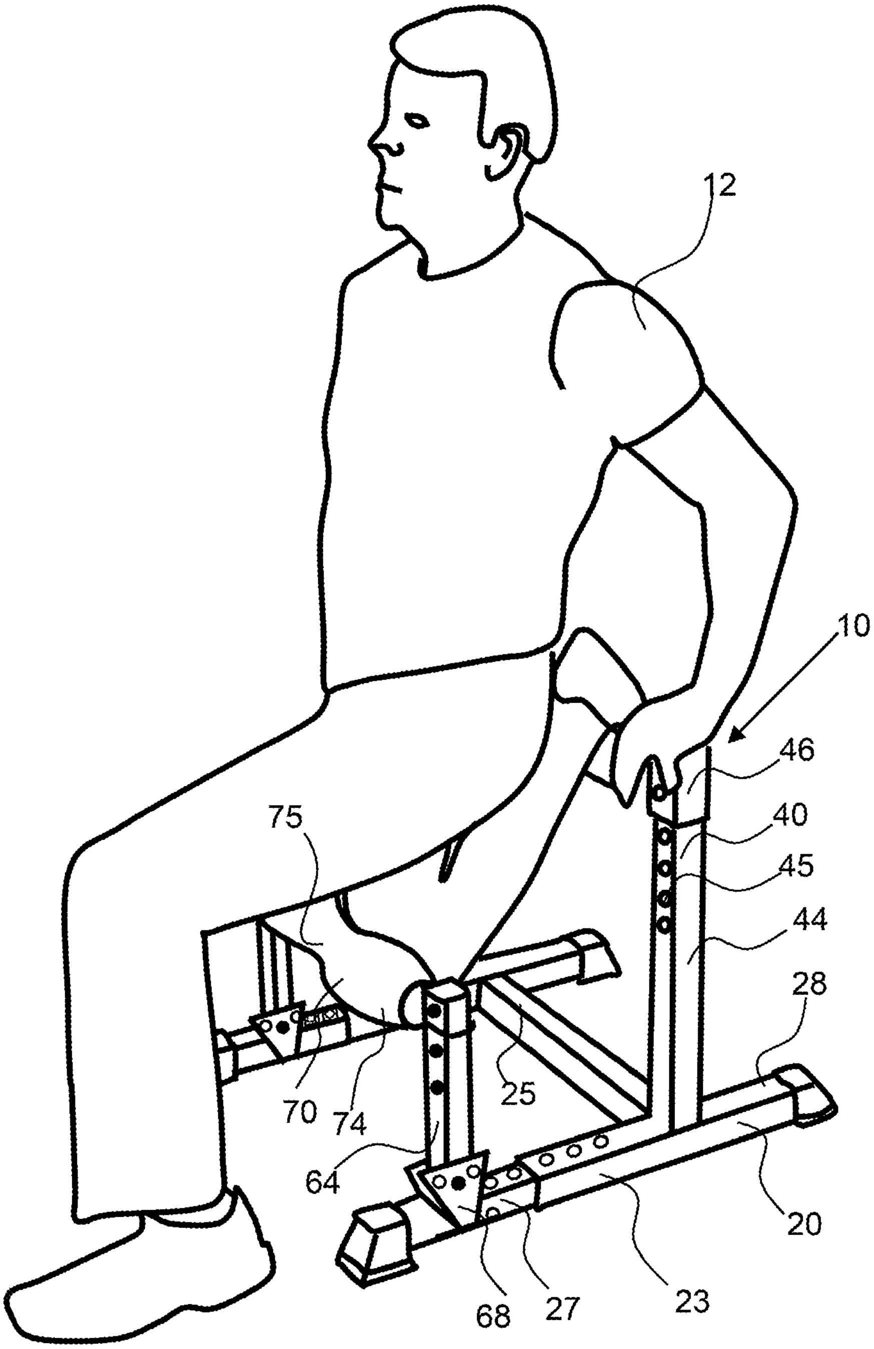
FIGS. 5 and 6 show a person stretching using an exemplary stretch apparatus having an ankle beam, a leg beam and a brace beam all coupled to a base, wherein the person's ankle is retained in one of the ankle beam cups of the ankle beam and the person's thigh is retained in the center leg beam cup of the leg beam, and wherein the brace beam is detached.
Figure 6:
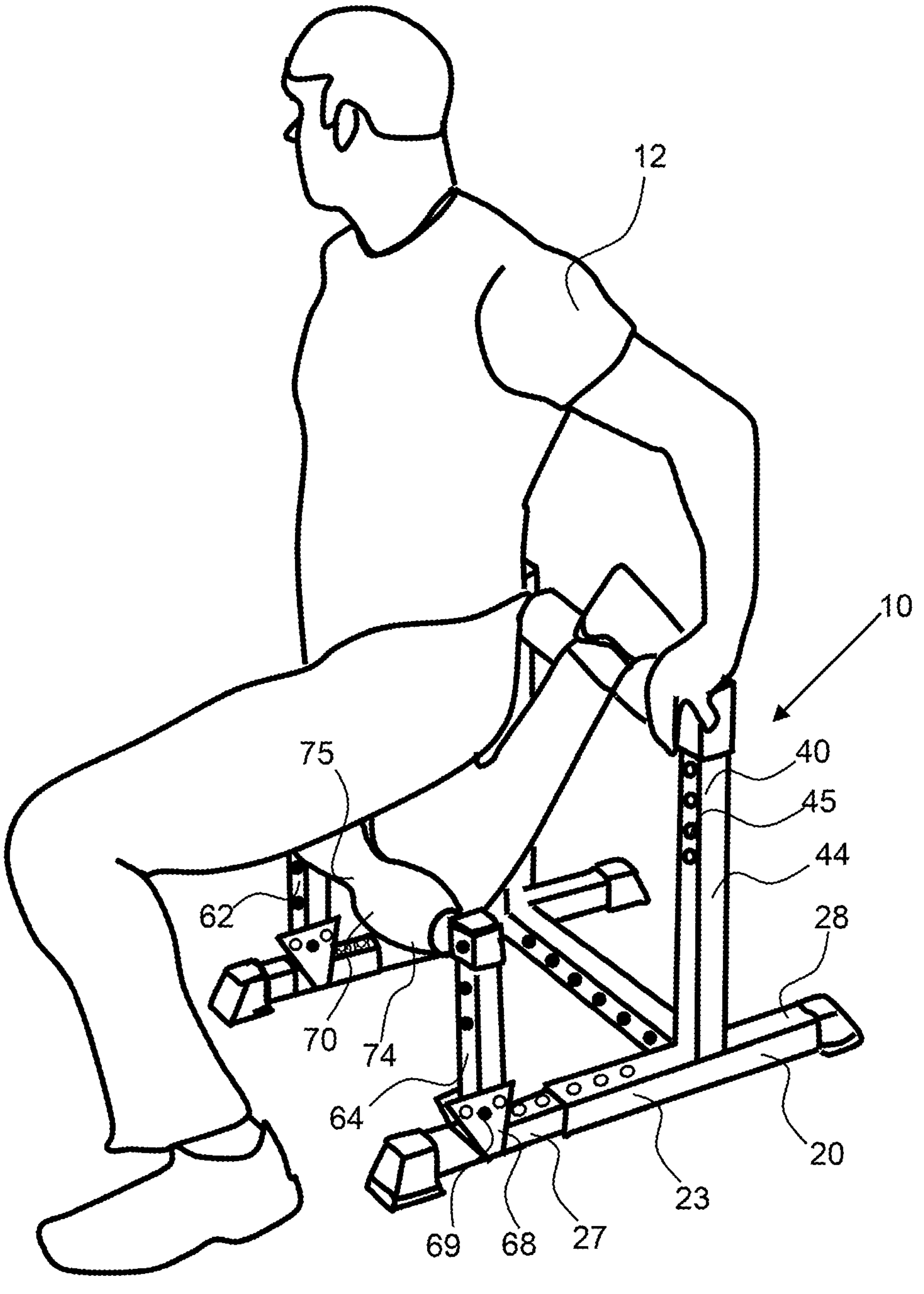

As shown in FIG. 3, the leg beam 70 is coupled to a leg base portion 27 of the base 20 that is configured to adjust the position of the leg brace with respect to the ankle base portion 23 of the base, or change the length offset distance 39 between the leg beam and the ankle beam. These two portions slide with respect to each other and have a base lock 36 configured to secure the two portions with respect to each other, such as a pin and aperture arrangement as shown in FIGS. 5 and 6. The width axis 14 is shown extending across the width of the stretch apparatus 10 from the left side to the right side and the length axis 29 is shown extending along the length of the stretch apparatus from the front 22 of the base to the back 24 of the base, or orthogonal to the leg beam length axis 79 and ankle beam length axis 59.

FIG. 4 shows a cross section of the stretch apparatus 10 with the ankle beam 50 offset vertically from the leg beam 70 a vertical offset distance 33; as shown as the offset distance from the ankle beam length axis 59 to the leg beam length axis 79. The ankle beam length axis 59 is configured a length offset distance 39 from the leg beam length axis 79. The ankle beam 50 has a center ankle beam cup 55 that is recessed a depression offset distance 53 from the outer perimeter of the ankle beam. Likewise, the leg beam 70 has a center leg beam cup 75 that is recessed a depression offset distance 76 from the outer perimeter of the leg beam. The ankle beam 50 has an elastic material 57 configured around an ankle beam shaft 58 and the elastic material and/or the shaft may be configured to rotate about the ankle beam length axis 59. The leg beam 70 has an elastic material 77 configured around a leg beam shaft 78 and the elastic material and/or the shaft may be configured to rotate about the leg beam length axis 79. The cross base extension 25 is sitting on a ground surface 18 and the vertical axis 16 and horizontal axis 17 are shown.

Referring now to FIGS. 5 and 6, a person 12 is shown stretching using an exemplary stretch apparatus 10 having an ankle beam 50, a leg beam 70 coupled to a base 20, wherein the person's ankle is retained in the ankle beam cup of the ankle beam and the person's thigh is retained in the center leg beam cup 75 of the leg beam. The brace beam is detached. As shown in FIG. 6, the person is turning their torso to their right side to stretch their right hip flexor and other muscles. The person can then turn to their left side to stretch their right hip flexor and other muscles in the opposing direction. This provides a unique way to stretch the hip. Also note that the leg base portion 27 of the base is slidably engaged with the ankle base portion 23 of the base 20.

Figure 7:
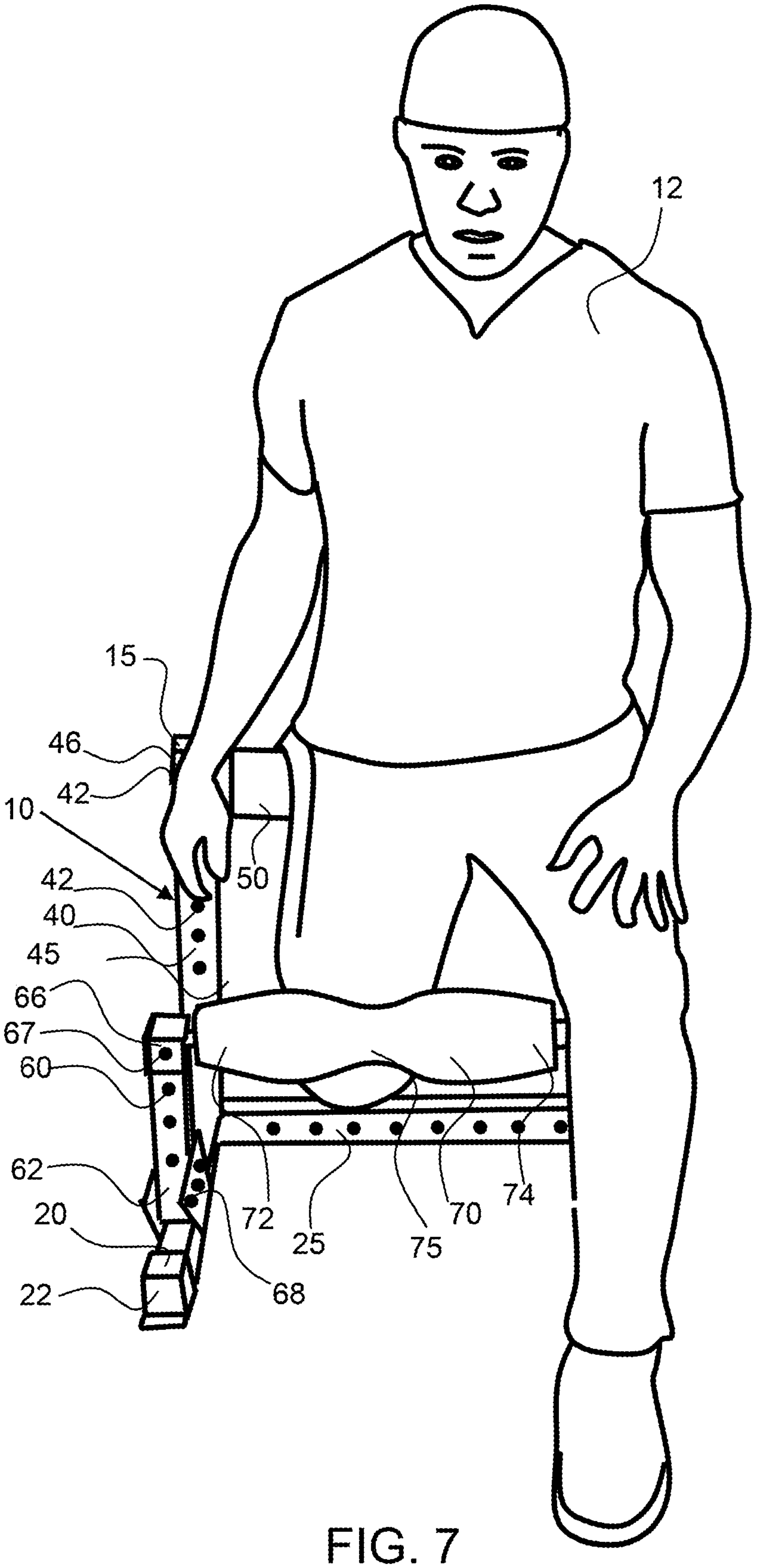
FIG. 7 shows a person stretching using an exemplary stretch apparatus having an ankle beam, a leg beam coupled to a base, wherein the person's ankle is retained in one of the ankle beam cups of the ankle beam and the person's thigh is retained in the center leg beam cup of the leg beam, and wherein the brace beam is detached.

As shown in FIG. 7, a person 12 is stretching using an exemplary stretch apparatus 10 having an ankle beam 50 and a leg beam 70 coupled to the base 20, wherein the person's ankle is retained in a center ankle beam cup of the ankle beam and the person's thigh is retained in the center leg beam cup 75 of the leg beam, and wherein the brace beam is detached. FIG. 7 shows a similar leg configuration to that shown in FIG. 5, except that the person is leaning more forward in the stretch shown in FIG. 7, putting additional force on the leg during the stretch.

Figure 8:
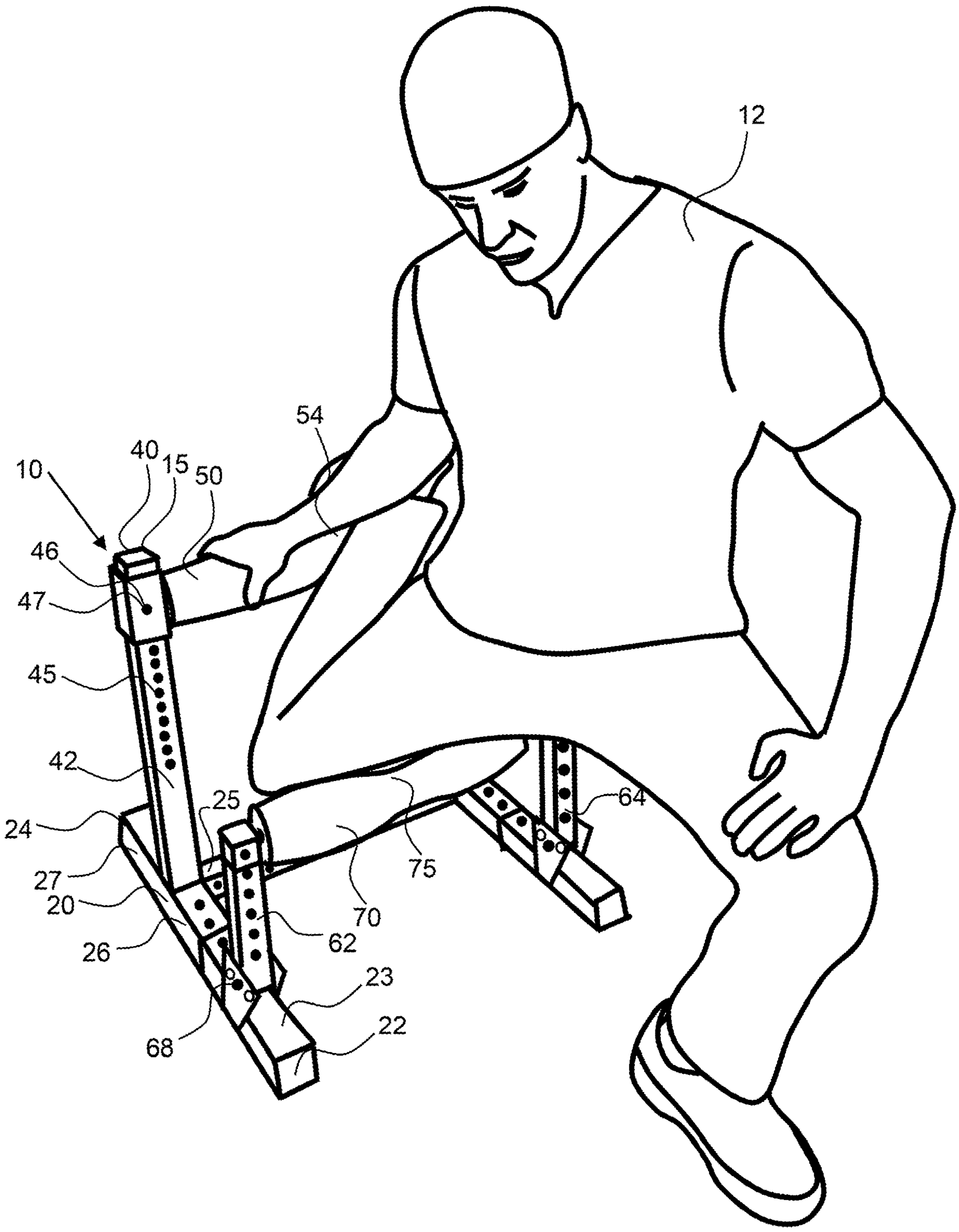
FIG. 8 shows a person stretching using an exemplary stretch apparatus having an ankle beam, a leg beam coupled to a base, wherein the person's ankle is retained on the ankle beam and the person's thigh is retained on the leg beam, and wherein the brace beam is detached Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As shown in FIG. 8, a person 12 is stretching using an exemplary stretch apparatus 10 with their right ankle configured in the right ankle beam cup 54, and their thigh pressed down into the center leg beam cup 75. The person is leaning forward to stretch and compress the thigh, and to stretch their hip flexor as well as muscles along the lower leg and abdomen or core muscles.

Some muscles and tendons that may be stretched by this apparatus include but are not limited to those in Table 1.

TABLE 1

| |
|---|
| Core |
| When leaning back |
| Psoas (minor and Major) |
| Iliacus |
| Rectus Abdominis |
| Anterior Hlp/Hip Flexors |
| Muscles of the Quad |
| Satorius |
| Rectus Femoris |
| Vastus Medialis |
| Vastus Lateralis |
| Vastus Intermedius |
| Articularis Genus |
| Extensor Digitorum |
| Extensor Hallucis |
| Tibialis Anterior |

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A stretch apparatus comprising:

a) a base configured on a ground surface;

b) an ankle beam tower coupled to the base and comprising an ankle riser extending vertically from the base;

c) an ankle beam coupled to the ankle riser and extending horizontally above the base along an ankle beam length axis and configured to support a foot or an ankle, wherein said ankle beam is circular in cross-section and comprises an ankle beam cup, a curved depression in the ankle beam that is configured to retain said foot or ankle in position laterally along said ankle beam;

wherein the ankle beam is vertically adjustable and comprises an ankle beam lock configured to retain the ankle beam to the ankle beam tower in a vertical position;

d) a leg beam tower coupled to the base and comprising a leg riser extending vertically from the base;

e) a leg beam coupled to the leg riser and configured horizontally above the base and below the ankle beam and extending along a leg beam length axis configured to support an upper leg portion;

wherein said leg beam is circular in cross-section and comprises a leg beam cup, a curved depression in the leg beam that is configured to retain said upper leg in position laterally along said leg beam; and wherein the leg beam length axis is offset a length offset distance and a vertical offset distance from the ankle beam length axis;

wherein the ankle beam is at least 150 mm above the leg beam, whereby in use for stretching, the stretch apparatus is configured with the ankle beam vertically above the leg beam such that an ankle of a person is positioned over the ankle beam and elevated above a knee of said person retained by the leg beam.

2. The stretch apparatus of claim 1, wherein the leg beam cup is a center leg beam cup.

3. The stretch apparatus of claim 2, wherein the leg beam comprises a left leg beam cup, said center leg beam cup, and a right leg beam cup.

4. The stretch apparatus of claim 3, wherein the left leg beam cup is a depression in the leg beam located proximal to a left end of the leg beam and the right leg beam cup is a depression in the leg beam located proximal to a right end of the leg beam.

5. The stretch apparatus of claim 4, wherein the ankle beam cup is a center ankle beam cup.

6. The stretch apparatus of claim 5, wherein the ankle beam comprises:

a left ankle beam cup;

a right ankle beam cup; and the center ankle beam cup, wherein the left ankle beam cup is in a depression in the ankle beam located proximal to a left end of the ankle beam and the right ankle beam cup is a depression in the ankle beam located proximal to a right end of the ankle beam.

7. The stretch apparatus of claim 1, wherein the leg beam is vertically adjustable and comprises a leg beam lock configured to retain the leg beam to the leg beam tower in a vertical position.

8. The stretch apparatus of claim 7, wherein the base comprises a leg base portion and an ankle base portion, wherein the leg base portion is slidably adjustable with the ankle base portion to adjust a length offset distance between the ankle beam and the leg beam.

9. The stretch apparatus of claim 7, wherein the leg beam tower is coupled with a pivot and is rotatable with respect to the base to adjust the length offset distance and the vertical offset distance.

10. The stretch apparatus of claim 1, further comprising a brace beam that extends horizontally from a brace beam coupled end to a brace beam extended end, and wherein the brace beam extends between the ankle beam and the leg beam, wherein the brace beam is configured vertically between the ankle beam and the leg beam, and extends within 30 degrees of orthogonal to the leg beam length axis.

11. The stretch apparatus of claim 10, wherein the brace beam is configured to pivot about the brace beam coupled end, wherein the brace beam extended end is configured more proximal to the leg beam and wherein the brace beam coupled end is configured more proximal to the ankle beam.

12. The stretch apparatus of claim 1, wherein the ankle beam cup is a center ankle beam cup.

13. The stretch apparatus of claim 12, wherein the ankle beam comprises:

a left ankle beam cup;

a right ankle beam cup; and the center ankle beam cup, wherein the left ankle beam cup is in a depression in the ankle beam located proximal to a left end of the ankle beam and the right ankle beam cup is a depression in the ankle beam located proximal to a right end of the ankle beam.

14. The stretch apparatus of claim 1, wherein the leg beam is supported by the leg beam tower coupled to the base, wherein the leg beam tower is coupled with a pivot and is rotatable with respect to the base to adjust a length offset distance between the ankle beam and the leg beam and the vertical offset distance.

15. The stretch apparatus of claim 1, further comprising a foot brace that is detachably attachable to the stretch apparatus.

* * * * *